United States Patent
Uemori et al.

(10) Patent No.: US 7,786,251 B2
(45) Date of Patent: Aug. 31, 2010

(54) PROCESS FOR PRODUCING POLYESTER ETHER POLY- OR MONO-OL

(75) Inventors: Shigeki Uemori, Kamisu (JP); Shigeru Ikai, Kamisu (JP); Chitoshi Suzuki, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 26 days.

(21) Appl. No.: 12/032,052

(22) Filed: Feb. 15, 2008

(65) Prior Publication Data

US 2008/0146775 A1 Jun. 19, 2008

Related U.S. Application Data

(63) Continuation of application No. PCT/JP2006/315875, filed on Aug. 10, 2006.

(30) Foreign Application Priority Data

Aug. 17, 2005 (JP) ............................. 2005-236504

(51) Int. Cl.
*C08G 63/82* (2006.01)

(52) U.S. Cl. ...................... 528/357; 528/358

(58) Field of Classification Search ................. 528/357, 528/358
See application file for complete search history.

(56) References Cited

U.S. PATENT DOCUMENTS

| 4,291,155 | A | | 9/1981 | Brochet |
| 5,032,671 | A | * | 7/1991 | Harper ..................... 528/357 |
| 6,008,312 | A | | 12/1999 | Shirasaka |
| 6,103,852 | A | | 8/2000 | Shirasaka |
| 2004/0068091 | A1 | | 4/2004 | Dixon et al. |
| 2006/0281891 | A1 | | 12/2006 | Tsuge et al. |
| 2007/0088146 | A1 | | 4/2007 | Nakamura et al. |

FOREIGN PATENT DOCUMENTS

| EP | 1 752 481 A1 | 2/2007 |
| JP | 4-31432 | 2/1992 |
| JP | 4-145123 | 5/1992 |
| JP | 4-359014 | 12/1992 |
| JP | 7-196778 | 8/1995 |
| JP | 2004-143314 | 5/2004 |
| JP | 2004-515586 | 5/2004 |
| JP | 2005-307194 | 11/2005 |
| WO | WO 01/30878 A1 | 5/2001 |
| WO | WO 02/36656 A2 | 5/2002 |

* cited by examiner

*Primary Examiner*—James Seidleck
*Assistant Examiner*—Gregory Listvoyb
(74) *Attorney, Agent, or Firm*—Oblon, Spivak, McClelland, Maier & Neustadt, L.L.P.

(57) ABSTRACT

To provide a process for producing a polyester ether poly- or mono-ol having a narrow molecular weight distribution, which is obtained by copolymerizing an initiator having hydroxyl groups with a cyclic ester compound and an alkylene oxide.

It is possible to produce a polyester ether poly- or mono-ol having a molecular distribution (Mw/Mn) of from 1.02 to 1.4 by copolymerizing a cyclic ester compound which carbon number is from 3 to 9 and an alkylene oxide which carbon number is from 2 to 20 with an initiator having from 1 to 12 hydroxyl groups and having a number average molecular weight (Mn) of from 18 to 20,000 in the presence of a double-metal cyanide complex catalyst is having tert-butyl alcohol as at least a part of an organic ligand.

7 Claims, No Drawings

PROCESS FOR PRODUCING POLYESTER ETHER POLY- OR MONO-OL

TECHNICAL FIELD

The present invention relates to a process for producing a polyester ether polyol or a polyester ether monool (hereinafter, referred to simply as a "polyester ether poly- or mono-ol") having a narrow molecular weight distribution, which is obtained by copolymerizing a cyclic ester compound and an alkylene oxide with an initiator having hydroxyl groups.

BACKGROUND ART

In general, a polyol compound such as a polyether polyol is produced by ring-opening addition polymerization of an alkylene oxide selected from e.g. ethylene oxide and propylene oxide, with an initiator having active hydrogen atoms. A polyol compound like this polyether polyol is used as a material for a functional lubricant or a polyurethane product such as a polyurethane elastomer, an elastic fiber, an adhesive agent or a sealant. The physical properties or mechanical properties of the polyurethane product or functional lubricant made from the polyether polyol as a material, may be influenced by the properties of the polyether polyol, such as the intermolecular force, crystallinity, hydrophilicity, solvent resistance, heat resistance and weather resistance. Therefore, a technique is used to modify the polyether polyol to adjust the properties. As such a technique, there is, for example, a method wherein a polyester polyol, a polycarbonate polyol or a polyoxytetramethylene glycol is used as an initiator, and with the initiator, an alkylene oxide is polymerized in a block form by ring-opening addition polymerization, to obtain a polyester ether polyol, a polycarbonate ether polyol or a polyether polyol. Also proposed is a method for producing a polyester ether polyol or a polycarbonate ether polyol, which contains, in its polyether main chain, ester bonds or carbonate bonds at random, or polyester chains or polycarbonate chains in a block form.

They may be used as materials for polyurethane products.

As a method for producing a polyester ether polyol having ester bonds in the main chain, a method for ring-opening addition polymerizing a cyclic ester compound (lactone) with a polyol initiator by using a tin-based catalyst to obtain a block copolymer having a narrow molecular weight distribution (e.g. Patent Document 1), or a method for ring-opening addition polymerizing an alkylene oxide and the cyclic ester compound by using an alkali metal compound catalyst to obtain a random copolymer (e.g. Patent Document 2), is reported.

However, if a block copolymer obtained by ring-opening addition polymerization of a cyclic ester with a polyol initiator by using the above tin-based catalyst, is reacted with a polyisocyanate to obtain a prepolymer, and the prepolymer is further reacted with a chain extender and/or a curing agent to obtain a polyurethane elastomer, such a polyurethane elastomer has a low tensile strength and its heat resistance is not high. Further, a polymer obtained by randomly copolymerizing an alkylene oxide and a cyclic ester compound by using the above alkali metal compound catalyst, has a high viscosity, and yet it is difficult to remove the alkali metal compound catalyst from the polymer, whereby there may be a problem such that ester bonds are easily hydrolyzed by the remaining catalyst.

Further, it is reported that a homopolymer of ε-caprolactone, and a random copolymer or a block copolymer of ε-caprolactone and propylene oxide may be obtained in the presence of double-metal cyanide complex catalysts containing glymes such as ethylene glycol dimethyl ether, diethylene glycol dimethyl ether and triethylene glycol dimethyl ether, as organic ligands (e.g. Patent Document 3). However, the double-metal cyanide complex catalysts used here do not have a high activity for ring-opening polymerization of a cyclic ester compound, so it is necessary to use a large amount of the catalyst for ring-opening addition polymerization of the cyclic ester compound. Therefore, a process step for removing the catalyst from the obtained copolymer will be necessary. Moreover, in this process, a polymerization solvent such as THF is used to make the molecular weight distribution of the obtainable copolymer to be narrow. Consequently, a process step for removing the polymerization solvent from the final product will be essential. In addition, since the reaction is carried out at a low temperature, there will be problems such that the ring-opening polymerization rate of the cyclic ester will be slow, and the productivity will be low.

Patent Document 1: JP-A-10-072516 (U.S. Pat. Nos. 6,008,312 and 6,103,852)

Patent Document 2: JP-A-2004-515586 (U.S. Patent Publication 2004-68091)

Patent Document 3: U.S. Pat. No. 5,032,671

DISCLOSURE OF THE INVENTION

Object to be Accomplished by the Invention

In view of the above problems, the object of the present invention is to provide a process for producing a polyester ether poly- or mono-ol having a narrow molecular weight distribution and an extremely low or substantially no content of an unreacted cyclic ester compound, by ring-opening addition copolymerization of a cyclic ester compound and an alkylene oxide.

Means to Accomplish the Object

The process for producing the polyester ether poly- or mono-ol of the present invention is characterized by copolymerizing at least one cyclic ester compound which carbon number is from 3 to 9 and at least one alkylene oxide which carbon number is from 2 to 20 with at least one initiator having from 1 to 12 hydroxyl groups and having a number average molecular weight (Mn) of from 18 to 20,000 at a reaction temperature of from 115 to 180° C. in the presence of a double-metal cyanide complex catalyst having tert-butyl alcohol as at least a part of an organic ligand, to obtain a polyester ether poly- or mono-ol having a molecular weight distribution (Mw/Mn) of from 1.02 to 1.4.

Further, in the above process, it is preferred that the mass of the cyclic ester compound is in a range of from 5 to 90% based on the total mass of the cyclic ester compound and the alkylene oxide used for the copolymerization.

Further, in the above process, it is preferred that the copolymerization of the cyclic ester compound and the alkylene oxide is random copolymerization or random/block copolymerization.

Further, the above copolymerization is preferably carried out in the absence of a solvent.

Further, in the above copolymerization, the double-metal cyanide complex catalyst is preferably used in such an amount that the total amount of metals derived from the double-metal cyanide complex catalyst in the polyester ether polyol and/or the polyester ether poly- or mono-ol obtained by the copolymerization, is from 1 to 30 ppm.

The double-metal cyanide complex catalyst used in the above process of the present invention contains as the organic ligand, preferably tert-butyl alcohol alone or a combination of tert-butyl alcohol and at least one member selected from the group consisting of n-butyl alcohol, sec-butyl alcohol, iso-butyl alcohol, tert-pentyl alcohol, iso-pentyl alcohol, N,N-dimethylacetamide and ethylene glycol mono-tert-butyl ether.

Further, the present invention provides a polyester ether polyol and/or a polyester ether monool obtained by the above process. Further, the present invention provides the polyester ether monool or the polyester ether polyol, which is used as a material for a polyurethane. Further, the present invention provides the polyester ether monool and/or the polyester ether polyol, which is used as a material for a functional lubricant or surfactant.

The present inventors have found that by using a double-metal cyanide complex catalyst having tert-butyl alcohol as at least part of the organic ligand, and setting the polymerization temperature to be at least 115° C., it is possible to smoothly carry out the copolymerization reaction of at least one cyclic ester compound which carbon number is from 3 to 9 and at least one alkylene oxide which carbon number is from 2 to 20 with the above initiator, and to make the molecular weight distribution (Mw/Mn) of the obtainable polyester poly- or mono-ol to be narrow at a level of from 1.02 to 1.4. The present invention has been accomplished on the basis of these discoveries.

EFFECTS OF THE INVENTION

By using the process for producing a polyester ether poly- or mono-ol of the present invention, it is possible to produce a polyester ether poly- or mono-ol having a narrow molecular weight distribution and an extremely low or substantially no content of an unreacted cyclic ester compound. The polyester ether poly- or mono-ol produced by using the process of the present invention has a low content of a polyether monool component having a terminal unsaturated bond which is easily oxidizable. Further, this polyester ether poly- or mono-ol has a narrow molecular weight distribution, and it has a lower viscosity as compared with a polyester ether poly- or mono-ol having the same number average molecular weight and a wider molecular weight distribution. The polyester ether poly- or mono-ol obtained in the present invention is suitable for use as a material for a polyurethane elastomer or a lubricant.

BEST MODE FOR CARRYING OUT THE INVENTION

The process for producing a polyester ether poly- or mono-ol of the present invention is, as mentioned above, characterized by copolymerizing an ester compound and an alkylene oxide with a particular initiator containing hydroxyl groups at temperature of from 115 to 180° C. by using a particular double-metal cyanide complex as a polymerization catalyst. Various materials and polymerization conditions used for the production process of the present invention will be described below. Further, the number average molecular weights (Mn), the weight-average molecular weights (Mw) and the molecular weight distributions (Mw/Mn) of the polyester ether poly- or mono-ols produced by Examples or the initiators having hydroxyl groups described in the present specification, are so-called polystyrene-base molecular weights, which are determined by gel permeation chromatography using, as a reference, monodispersed polystyrene having various polymerization degrees commercially available as standards for measurement of molecular weights. Further, in a case where the initiator is constituted solely by molecules of the same molecular weight, such as a low molecular weight alcohol, the molecular weight obtained from the chemical formula will be regarded as the number average molecular weight (Mn).

Double Metal Cyanide Complex Catalyst

In the process for producing a polyester ether poly- or mono-ol of the present invention, a double-metal cyanide complex catalyst (hereinafter referred to simply as DMC catalyst) having tert-butyl alcohol as at least a part of the organic ligand, is used as a catalyst for the copolymerization reaction (ring-opening polymerization) of a cyclic ester compound and an alkylene oxide.

The above-mentioned DMC catalyst to be used for the present invention is typically represented by the following formula 1.

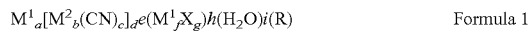

$$M^1{}_a[M^2{}_b(CN)_c]_d e(M^1{}_f X_g) h(H_2O) i(R) \qquad \text{Formula 1}$$

In the formula 1, $M^1$ is a metal atom selected from Zn(II), Fe(II), Fe(III), Co(II), Ni(II), Mo(IV), Mo(VI), Al(III), V(V), Sr(II), W(IV), W(VI), Mn(II), Cr(III), Cu(II), Sn(II) and Pb(II), and it is preferably Zn(II) or Fe(II). Further, roman numerals in parentheses following metal atoms represent atomic valences. $M^2$ is a metal atom selected from Fe(II), Fe(III), Co(II), Co(III), Cr(II), Cr(III), Mn(II), Mn(III), Ni(II), V(IV) and V(V), and it is preferably Co(III) or Fe(III). X is a halogen atom. R is an organic ligand, which is tert-butyl alcohol alone, or a combination of tert-butyl alcohol and at least one compound selected from a group consisting of n-butyl alcohol, sec-butyl alcohol, iso-butyl alcohol, tert-pentyl alcohol, iso-pentyl alcohol, N,N-dimethyl acetamide and ethylene glycol monotert-butyl ether. a, b, c, d, e, f, g, h and i are positive numbers which represent atomic valences of metal atoms or coordination numbers of organic ligands. The particularly preferred organic ligand of the present invention is tert-butyl alcohol alone, or a combination of tert-butyl alcohol and ethylene glycol mono-tert-butyl ether, and a DMC catalyst having such an organic ligand shows a particularly high polymerization activity for a polymerization reaction of a cyclic ester and an alkylene oxide with the particular initiator having hydroxyl groups, and in addition, it is capable of narrowing the molecular weight distribution of a polyester ether poly- or mono-ol to be obtained by the polymerization.

The process for producing the DMC catalyst to be used in the present invention may be an optional process and is not particularly limited. For example, there may be mentioned (i) a process wherein a halogenated metal salt is reacted with a cyanometallic acid and/or an alkali metal cyanometalate in an aqueous solution; an organic ligand is coordinated to the obtained reaction product; and then, the formed solid component is separated, and further, the separated solid component is washed with an aqueous solution of the organic ligand; or (ii) a process wherein a halogenated metal salt is reacted with a cyanometallic acid and/or an alkali metal cyanometalate in an aqueous solution of the organic ligand; the obtained reaction product (solid component) is separated; and then, the separated solid component is washed with an aqueous solution of the organic ligand. Further, a process may be mentioned wherein the cake (solid component) obtained by such a process is separated by filtration and dried.

The metal constituting the above alkali metal cyanometalate or cyanometallic acid to be used for producing the DMC catalyst, is preferably at least one metal selected from Fe(II), Fe(III), Co(II), Co(III), Cr(II), Cr(III), Mn(II), Mn(III), Ni(II), V(IV) and V(V), more preferably Co(III) or Fe(III), particularly preferably Co(III). The cyanometallic acid or the alkali metal cyanometalate to be used as a material for the production of DMC catalyst of the present invention is preferably $H_3[Co(CN)_6]$, $Na_3[Co(CN)_6]$ or $K_3[Co(CN)_6]$, most preferably $Na_3[Co(CN)_6]$ or $K_3[Co(CN)_6]$.

Further, the metal constituting the above halogenated metal salt to be used for producing the DMC catalyst, is preferably Zn(II), Co(II), or Fe(II). As the halogenated metal salt, zinc chloride, zinc bromide or zinc iodide is preferred.

Further, in the process for producing the above-mentioned DMC catalyst, before the step of separating the cake by filtration, a polyether polyol and/or a polyether monool is mixed in an aqueous organic ligand solution having a solid component dispersed therein, and water and an excessive amount of the organic ligand are distilled from the obtained mixed solution to prepare a DMC catalyst mixture in the form of a slurry (hereinafter referred to also as slurried DMC catalyst) wherein the DMC catalyst is dispersed in the polyether polyol and/or the polyether monool.

The polyether polyol and the polyether monool to be used for preparing the above slurried DMC catalyst are prepared by ring-opening addition polymerization of an alkylene oxide with at least one initiator selected from the group consisting of monohydric alcohols and polyhydric alcohols by using an anionic polymerization catalyst or a cationic polymerization catalyst. The polyether monool or the polyether polyol used for this purpose is preferably one having from 1 to 8 hydroxyl groups and a number average molecular weight of from 300 to 5,000, whereby the DMC catalyst will have a high polymerization activity, and will be easy to handle because the viscosity of the slurried DMC catalyst will not be high.

The amount of DMC catalyst used for polymerization of a cyclic ester compound and an alkylene oxide is preferably as small as possible. As the amount of DMC catalyst used for a polymerization reaction becomes smaller, it is possible to reduce the amount of the DMC catalyst and the metal compound derived from the DMC catalyst, remaining in the obtained polyester ether poly- or mono-ol. It is thereby possible to reduce the reaction rate of the polyester poly- or mono-ol with a polyisocyanate, or an influence of the remaining DMC catalyst which affects the physical properties of a functional lubricant or a polyurethane product produced by using the polyester ether poly- or mono-ol as a material. It is common to carry out an operation to remove the DMC catalyst from the polyester ether poly- or mono-ol obtained by copolymerization of a cyclic ester and an alkylene oxide with an initiator. However, as mentioned above, when the amount of DMC catalyst remaining in the polyester ether poly- or mono-ol is small, and it does not affect the characteristic of the final product or the subsequent reaction with a polyisocyanate, it is possible to move on to the next step by using the polyester ether poly- or mono-ol without removing the DMC catalyst, and therefore it is possible to increase the efficiency of producing the polyester ether poly- or mono-ol.

In the process for producing a polyester ether poly- or mono-ol of the present invention, it is preferred to carry out the copolymerization reaction of the cyclic ester and the alkylene oxide with the initiator by using the DMC catalyst in such an amount that the total amount of metal, e.g. Zn and Co, derived from the DMC catalyst contained in the obtained polyester ether poly-mono-ol, will be preferably from 1 to 30 ppm, more preferably at most 10 ppm, in the polymer upon completion of polymerization. By controlling the total amount of the metal derived from the DMC catalyst contained in the polymer to be at most 30 ppm, it will be easier to omit the step of removing the remaining catalyst from the polyester ether poly- or mono-ol obtained from polymerization.

Depending upon the particular use, it is possible to carry out treatment for removal of the DMC catalyst and/or treatment for deactivation of the DMC catalyst in the polyester ether poly- or mono-ol. As such a method, it is possible to use, for example, an adsorption method by using an adsorbent selected from e.g. a synthetic silicate (such as magnesium silicate or aluminum silicate), an ion exchange resin or activated clay; a neutralization method by an amine, an alkali metal hydroxide, an organic acid or a mineral acid; or a combination of the neutralization method and the adsorption method.

Initiator

In the present invention, it is preferred to use, as the initiator, a compound having 1 to 12 hydroxyl groups and a number average molecular weight (Mn) of from 18 to 20,000. The specific compound may, for example, be a monovalent alcohol such as methanol, ethanol, 2-propanol, n-butanol, isobutanol, 2-ethylhexanol, decyl alcohol, lauryl alcohol, tridecanol, cetyl alcohol, stearyl alcohol or oleyl alcohol; water; a divalent alcohol such as ethylene glycol, diethylene glycol, propylene glycol, dipropylene glycol, 1,3-propanediol, 1,4-cyclohexanediol, 1,3-butanediol, 1,4-butanediol, 1,6-hexanediol or 1,4-cyclohexanediol; a polyvalent (at least trivalent) alcohol such as glycerol, diglycerol, trimethylolpropane, pentaerythritol, dipentaerythritol or tripentaerythritol; a saccharine or its derivative, such as glucose, sorbitol, dextrose, fructose, sucrose or methyl glucoside; a phenol compound such as bisphenol A, bisphenol F, bisphenol S, novolac, resol or resorcin. They may be used alone or in combination as a mixture of two or more of them.

The initiator which may be used in the present invention contains a polymerized compound selected from a polyether polyol such as a polyoxypropylenediol, a polyoxypropylenetriol or a polyethylene glycol; a polycarbonate polyol; a polyester polyol; and a polyoxytetramethylene glycol. These compounds preferably have a number average molecular weight (Mn) of from 300 to 20,000, and have 1 to 12 hydroxyl groups per one molecule. Further, in such a case, it is particularly preferred to use one having a number average molecular weight (Mn) of from 300 to 5,000, more preferably 300 to 2,500 per a hydroxyl group. The polyether polyol may be one obtained by known ring-opening addition polymerization of an alkylene oxide with a proper initiator (one exemplified above).

The number average molecular weight (Mn) of the initiator to be used in the present invention is from 18 to 20,000, preferably from 300 to 10,000. Particularly, it is preferred to use the initiator having a number average molecular weight (Mn) of at least 300, further preferably the polymerized compound, whereby it is possible to reduce the time until the beginning of the ring-opening polymerization reaction of a cyclic ester compound and an alkylene oxide in the presence of a DMC catalyst. In such a case, it is particularly preferably from 600 to 5,000.

Further, by using the initiator having the number molecular weight (Mn) of at most 20,000, it is possible to uniformly carry out the copolymerization of the cyclic ester compound and the alkylene oxide with the initiator, the viscosity of the initiator not being too high.

The number of hydroxyl groups in the initiator is preferably from 1 to 12, more preferably from 1 to 8, most preferably from 1 to 6. By using the initiator having at most 12 hydroxyl groups, it will be easier to narrow the molecular weight distribution of the polyester ether poly- or mono-ol to be obtained. When a mixture of at least two types of compounds is used as the initiator, the average number of hydroxyl groups per one molecule is preferably from 1 to 12, more preferably from 1 to 8, most preferably from 1 to 6. Moreover, the number of the hydroxyl groups of the polyester ether poly- or mono-ol prepared in the present invention is the number of the hydroxyl groups of the initiator to be used.

When the polyether poly- or mono-ol is used as the initiator, its molecular weight distribution (Mw/Mn) is preferably at most 3.0, particularly preferably from 2.0 to 1.0. The proportion of the initiator portion in the total mass of the final product, i.e. the polyester ether poly- or mono-ol, is usually from 5 to 80 mass %. Particularly, when the polymerization reaction is to be carried out to make the mass of the initiator portion to be at least 50% of the total mass of the polyester ether poly- or mono-ol, it is preferred to use, as the initiator, a polyether poly- or mono-ol having a molecular weight distribution (Mw/Mn) of at most 3.0, whereby it will be easy to adjust the molecular weight distribution (Mw/Mn) of the polyester ether poly- or mono-ol as the final product to be at most 1.4. It is thereby possible to decrease the viscosity of the obtained polyester ether poly- or mono-ol, and it is possible to have a suitable viscosity for use as a material for lubricants of machines or a material for urethane elastomers.

Cyclic Ester Compound

The cyclic ester compound to be used in the present invention is a cyclic ester compound which carbon number is from 3 to 9, so-called a lactone. The specific cyclic ester compound may, for example, be β-propiolactone, δ-valerolactone, ε-caprolactone, α-methyl-β-propiolactone, β-methyl-β-propiolactone, methoxy-ε-caprolactone or ethoxy-ε-caprolactone. ε-caprolactone is particularly preferred. These cyclic ester compounds may be used alone or in a combination as a mixture of two or more of them. On the other hand, a five membered-ring such as a butyrolactone has a low reactivity, so it is not preferred to use it for the process of the present invention.

Alkylene Oxide

The alkylene oxide used in the process of the present invention, is preferably an alkylene oxide which carbon number is from 2 to 20. The alkylene oxide used in the present invention may, for example, be ethylene oxide, propylene oxide, 1,2-butylene oxide, 2,3-butylene oxide, styrene oxide, oxetane, cyclopentane oxide, cyclohexane oxide or an α-olefin oxide which carbon number is from 5 to 20. It is possible to use one or more of them. In the present invention, it is preferred to use one or at least two members selected from ethylene oxide, propylene oxide, 1,2-butylene oxide, styrene oxide and oxetane. Further, it is possible to use ethylene oxide and/or propylene oxide with a small amount of tetrahydrofuran to carry out a polymerization reaction.

Copolymerization Modes which May be Used for the Process of the Present Invention In the present invention, in the presence of the above initiator and the DMC catalyst, polymerization is carried out by adding at least one type of the above alkylene oxides and at least one type of cyclic esters into a reactor at the same time to obtain a random copolymer of the polyester ether poly- or mono-ol (random copolymerization). Otherwise, it is also possible to obtain a block copolymer of the polyester ether polyol by sequentially adding at least one type of the alkylene oxides and at least one type of the cyclic ester compounds (block copolymerization). Further, the addition sequence and the addition amounts are controlled, whereby a polyester chain portion derived from the cyclic ester and/or a polyoxyalkylene chain portion is introduced in parts of a molecule to obtain a polyester ether poly- or mono-ol wherein the random copolymerization portions and the block copolymerization portions are present in the same molecule (random-block copolymerization). In the present invention, the random copolymerization or the random-block copolymerization is preferred.

In the present invention, the proportion of the cyclic ester compound in the total mass of the cyclic ester compound and the alkylene oxide used for polymerization (the total mass of the polymerization monomers) is preferably from 5 to 90 mass %, particularly preferably from 5 to 70 mass %. When the proportion of the cyclic ester compound in the total mass of the polymerization monomers is made to be at least 5 mass %, it is possible to improve at least one of the properties such as heat resistance, lubricity and biodegradability of the final product such as an urethane resin or lubricant produced by using the obtained polyester ether poly- or mono-ol. On the other hand, when the proportion of the cyclic ester compound is made to be at most 90 mass %, it is possible to have the molecular weight distribution (Mw/Mn) of the obtained polyester ether poly- or mono-ol to be at most 1.4.

Polymerization Method and Polymerization Conditions

The polyester ether poly- or mono-ol of the present invention is obtained by the copolymerization reaction of the cyclic ester compound and the alkylene oxide in the presence of the above initiator and the DMC catalyst. Usually, using a pressure-resistant reactor, and the initiator and the DMC catalyst are added thereto and heated to a prescribed reaction temperature, and then, the cyclic ester compound and the alkylene oxide are introduced into the reactor sequentially or in combination of them and copolymerized with stirring and heating. The cyclic ester compound and the alkylene oxide may be continuously added (introduced) to the reactor, or the prescribed amounts may be sequentially added (introduced).

As a method for adding (introducing) the cyclic ester compound and the alkylene oxide to the reactor, direct addition (introduction) to the liquid phase of the reaction mixture, or addition (introduction) to the gas phase inside the reactor; or a combination of the two, may be mentioned. The cyclic ester compound and the alkylene oxide may be added (introduced) individually or as a mixture into the reactor.

The polymerization reaction temperature of the present invention is in the range of from 115 to 180° C. It is preferably from 120 to 180° C., more preferably from 125 to 180° C., further preferably from 125 to 160° C. By setting the polymerization reaction temperature to be at least 115° C., it is possible to have the cyclic ester compound reacted together with the alkylene oxide at a sufficiently fast rate of the reaction, whereby it is possible to lower the amount of an unreacted cyclic ester compound contained in the polyester ether poly- or mono-ol as the final product, and it is possible to obtain the polyester ether poly- or mono-ol having the desired monomer composition. In addition, by setting the polymerization temperature to be at most 180° C., it is possible to maintain the high activity of the DMC catalyst to prevent remaining of an unreacted alkylene oxide or cyclic ester compound, and it is also possible to narrow the molecular weight distribution of the polyester ether poly- or mono-ol.

For the polymerization reaction of the present invention, it is possible to use a solvent which does not affect the polymerization reaction. It is optional to use the solvent. However, in the present invention, it is preferred not to use a reaction solvent. By not using the reaction solvent, it will be unnecessary to have a step of removing the solvent from the polyester ether poly- or mono-ol as the final product, and the productivity will be increased.

In the copolymerization reaction of the present invention, the condition for stirring the reaction mixture is not limited, but it is preferred to carry out the polymerization reaction under a suitable stirring condition for the reaction mixture. A large impeller is preferred because it is thereby possible to mix inside of the reactor uniformly; it is possible to adjust the viscosity within a wide range; and the gas absorbency from the gas-liquid interface to the liquid phase is high. As a specific preferred stirring impeller, FULLZONE (tradename) impeller manufactured by KOBELCO ECO-SOLUTIONS CO., LTD, or MAXBLEND (tradename) impeller manufactured by Sumitomo Heavy Industries, Ltd., may be mentioned.

When a stirring method using the common stirring impeller is employed, it is preferred to increase the rotational speed of the stirring impeller within a range where the stirring efficiency will not become decreased by that large amount of gas taken from the gas phase in the reactor into the reaction liquid. Further, for the present invention, it is preferred to decrease the rate of supplying the cyclic ester compound and the alkylene oxide to the reactor since the molecular weight distribution of the obtained polymer may be thereby narrowed; nevertheless, in such a case, the productivity will be lowered. Therefore, it is preferred to determine the rate of supplying the cyclic ester compound and the alkylene oxide to the reactor by taking the balance of both aspects into consideration.

As the specific rate of supplying the cyclic ester compound and the alkylene oxide to the reactor, the rate is preferably within the range of from 0.01 to 70 mass %/hr based on the total mass of the polyester ether poly- or mono-ol expected as the final product. Further, the rates of supplying the cyclic ester compound and the alkylene oxide may be the same or different. Moreover, changing the rate of supplying the cyclic ester compound and/or the alkylene oxide to the reactor in the middle of the polymerization reaction, is in the range of the present invention.

The polymerization reaction in the present invention may be carried out by a batch method or a continuous method.

The molecular weight distribution (Mw/Mn) of the polyester ether poly- or mono-ol obtained by the process of the present invention is preferably from 1.02 to 1.4.

Further, the number average molecular weight (Mn) of the polyester ether poly- or mono-ol obtained by the process of the present invention is preferably from 200 to 100,000, more preferably from 500 to 20,000. By adjusting the number average molecular weight (Mn) of the copolymer of the present invention to be at least 200, it is possible to increase the number of polymer units derived from the cyclic ester compound in the polymer, whereby at least one of the characteristics such as heat resistance and lubricity will be improved. Further, by adjusting the number average molecular weight (Mn) to be at most 100,000, it is possible to have a proper viscosity which is not too high as a material for a polyurethane resin or a lubricant, and it is easy to adjust the molecular weight distribution (Mw/Mn) to be at most 1.4.

Further, the number average molecular weight (Mn) per hydroxyl group of the polyester poly- or mono-ol produced by the process of the present invention, is preferably from 200 to 50,000, more preferably from 500 to 10,000.

The adjustment of the molecular weight distribution (Mw/Mn) of the polyester ether poly- or mono-ol to be from 1.02 to 1.4, may be carried out very easily by using the DMC catalyst having the above tert-butanol as at least a part of the organic ligand, as the above copolymerization catalyst, and by properly selecting the rate of supplying the cyclic ester compound and the alkylene oxide, and adjusting the polymerization temperature and the stirring conditions. Further, the adjustment of the number average molecular weight (Mn) of the polyester ether poly- or mono-ol to be in the above preferred range, is carried out by adjusting the number of mols of the cyclic ester compound and the alkylene oxide to be copolymerized based on the number of mols of the initiator to be used.

By using the copolymerization reaction of the present invention, it is easy to prepare a polyester ether monool or a polyester ether polyol having at least three hydroxyl groups which has been difficult to prepare by a conventional esterification reaction or an ester exchange reaction.

Additives

To the polyester ether poly- or mono-ol of the present invention, it is possible to add an additive selected from an anti-oxidant of a hindered phenol type or a hindered amine type, a non-iron anticorrosive of a benzotriazole type, an ultraviolet absorber of a triazole type or a benzophenone type, and a reducing agent of a boron compound, to prevent deterioration during the storage over a long period of time.

Further, to the polyester ether poly- or mono-ol of the present invention, to adjust the pH, it is possible to add a compound selected from a mineral acid such as phosphoric acid, phosphorous acid, hypophosphorous acid, pyrophosphoric acid, hydrochloric acid, sulfuric acid or sulfurous acid; an organic acid such as formic acid, oxalic acid, succinic acid, acetic acid, maleic acid, benzoic acid, paratoluene sulfonic acid or dodecyl benzene sulfonic acid; an alkali metal hydroxide or alkaline earth metal hydroxide such as sodium hydroxide, potassium hydroxide, lithium hydroxide, rubidium hydroxide, cesium hydroxide, magnesium hydroxide, calcium hydroxide, strontium hydroxide or barium hydroxide; an alkali metal carbonate or alkaline earth metal carbonate such as lithium carbonate, sodium carbonate, potassium carbonate, rubidium carbonate, cesium carbonate, magnesium carbonate, calcium carbonate or barium carbonate; an alkali metal or alkaline earth metal hydrogencarbonate such as lithium hydrogencarbonate, potassium hydrogencarbonate, sodium hydrogencarbonate or cesium hydrogencarbonate; a phosphate such as lithium diphosphate, sodium dihydrogenphosphate, potassium dihydrogenphosphate, lithium monohydrogenphosphate, sodium monohydrogenphosphate, potassium monohydrogenphosphate or disodium dihydrogenpyrophosphate; a hydrogensulfate such as lithium hydrogensulfate, sodium hydrogensulfate or potassium hydrogensulfate; an aliphatic amine such as ethylene diamine, diethylene triamine or hexamethylene diamine; an aromatic amine such as tolylene diamine or diphenyl methane diamine; and an organic alkaline compound such as an alkanolamine such as monoethanolamine or diethanolamine.

By the process of the present invention, it is easy to produce the polyester ether poly- or mono-ol having a copolymer chain which is constituted by the random copolymerization of the cyclic ester compound and the alkylene oxide. This polyester ether poly- or mono-ol has an extremely small content of an unreacted cyclic ester compound or has no substantial unreacted cyclic ester compound. Further, the amount of the catalyst to be used is extremely small, whereby purification is unnecessary or it is carried out easily. Thus, the process of the present invention is very useful.

Further, it is possible to produce various structures of polyester ether poly- or mono-ol having random copolymer chains or random/block copolymer chains by changing types or proportions of the alkylene oxide and the cyclic ester compound to be used. Therefore, from the viewpoint of a high degree of freedom in the structural design of the polyester ether poly- or mono-ol, the process of the present invention is very useful.

The polyester ether poly- or mono-ol obtained by the process of the present invention has a narrow molecular weight distribution and low viscosity, so it is excellent in handling. Further, this polyester ether poly- or mono-ol may be reacted with a polyisocyanate compound, and optionally, a chain extender, to produce various urethane products. Moreover, the polyester ether poly- or mono-ol obtained by the present invention may be used as a functional lubricant, such as a base oil for grease, compressor oil, rolling oil, gear oil, metal-working fluid, traction drive oil, engine oil or excavation oil; a surfactant; or a material for a polymer dispersed polyester ether poly- or mono-ol containing fine polymer particles.

EXAMPLES

Now, the present invention will be described in further detail with reference to Examples and Comparative Examples. However, it should be understood that the present invention is by no means restricted to such specific Examples.

Method for Measurement

In Examples, viscosities are the values measured by using a type E viscometer, VISCONIC EHD Model (manufactured by TOKIMEC INC.) and by using No. 1 rotor. The number average molecular weight (Mn), the weight-average molecular weight (Mw) or the molecular weight distribution (Mw/Mn) of a polymer such as a polyester ether poly- or mono-ol or polyether poly- or mono-ol is a polystyrene-base molecular weight obtained by measurement by the gel permeation chromatography and by using a calibration curve prepared by using a standard polystyrene of a known molecular weight. Further, the amount of metal derived from the catalyst contained in the polyester ether poly- or mono-ol is measured as follows: The prescribed amount of the polyester ether poly- or mono-ol containing the catalyst was put into an Erlenmeyer flask, and 100 mL of deionized water and 20 mL of each of concentrated hydrochloric acid and concentrated nitric acid were added, followed by adding zeolite and then by boiling for three hours. Further, 10 mL of hydrochloric acid was added into the Erlenmeyer flask, followed by boiling for two hours and then by filtration with No. 5A filter paper, and the filtrate was properly diluted with deionized water and analyzed by ICP emission spectrometry.

Preparation Example 1 for Double-Metal Cyanide Complex Catalyst

In 500 mL of flask, a zinc chloride aqueous solution comprising 10.2 g of zinc chloride and 10 g of deionized water, was prepared. Then, while an aqueous solution comprising 4.2 g of potassium hexacyano cobaltate ($K_3[Co(CN)]_6$) and 75 g of deionized water, was kept at 40° C., the above zinc chloride aqueous solution was dropwise added over 30 minutes with stirring at 300 rpm. After completion of the dropwise addition and further stirring for 30 minutes, a mixture comprising 80 g of tert-butyl alcohol (hereinafter referred to as TBA), 80 g of deionized water and 0.6 g of a polyol (hereinafter referred to as polyol X) having a number average molecular weight (Mn) of 1000 which was obtained by an addition polymerization of propylene oxide (hereinafter referred to as PO) with dipropylene glycol was added. After stirring for 30 minutes at 40° C. and further for 60 minutes at 60° C., filtration was carried out by using a circular filter plate having a diameter of 125 m and a quantifying filter paper (No. 5C manufactured by ADVANTEC) for fine particles, under a pressure of 0.25 MPa, and then a solid was separated in about 50 minutes.

Then, to the cake containing a double-metal cyanide complex, a mixture of 36 g of TBA and 84 g of deionized water was added, followed by stirring for 30 minutes, and then, pressure filtration was carried out for 15 minutes. Further, to the cake thereby obtained, a mixture of 108 g of TBA and 12 g of deionized water was further added, followed by stirring for 30 minutes to obtain a slurry of TBA containing the double-metal cyanide complex (zinc hexacyano cobaltate complex).

To this slurry, 100 g of the polyol X was added, followed by stirring for 3 hours at 80° C. and then, by drying under reduced pressure for 4 hours at 115° C. to obtain a double-metal cyanide complex catalyst (slurry catalyst A) having TBA as an organic ligand. The concentration of the double-metal cyanide complex in the slurry catalyst A was 4.10 mass %.

Preparation Example 2 for Double-Metal Cyanide Complex Catalyst

A slurry catalyst B containing 4.6% of the double-metal cyanide complex as a solid portion, was obtained in the same manner as described in the above Preparation Example 1, except that in the above Preparation Example 1 for a double-metal cyanide complex catalyst, TBA used for producing the slurry catalyst A was changed to ethylene glycol dimethyl ether (hereinafter referred to as glyme).

Syntheses of Polyester Ether Polyols

Example 1

Preparation Example for Random Copolymer of ε-Caprolactone and Propylene Oxide

Into a pressure-resistant reactor (capacity: 10 L) made of stainless steel and equipped with a stirrer comprising one set of anchor vanes and two sets of double paddle vanes with an angle of 45°, 1,000 g of polyoxypropylene diol (Mw/Mn=1.10, Mn=1,390) as an initiator, and 2,440 mg of the above slurry catalyst A (10.2 ppm as the amount of metal in the polymer upon completion of the polymerization) were added. After the interior of the reactor was flushed with nitrogen, the temperature was raised to 140° C., and with stirring, 50 g of propylene oxide was supplied to the reactor, followed by a reaction (preliminary supplying of monomer) to activate the catalyst. After confirming that the pressure inside the reactor was decreased and the catalyst was activated, 500 g of the propylene oxide and 500 g of ε-caprolactone were respectively supplied with stirring, into the reactor at a rate of about 80 g/hr. Propylene oxide and ε-caprolactone were supplied for 6 hours and 20 minutes, and stirring was continued for further 1 hour. During that time, the temperature inside the reactor was kept at 140° C., and the rate of stirring was kept at 500 rotation per minute to have the polymerization reaction progressed. Mw/Mn of the polyester ether diol obtained by this reaction was 1.11, and Mn was 2,950. The appearance of the obtained polyester ether diol was a slightly hazy liquid form at room temperature, and the viscosity at 25° C. was 810 mPa·s. From the results of $^1$H-NMR and $^{13}$C-NMR, it was confirmed that this diol had a random copolymer chain of ε-caprolactone and propylene oxide.

Examples 2 and 19

Preparation Examples for Random Copolymers of
ε-Caprolactone and Propylene Oxide A polyol was obtained in the same manner as in Example 1, by using the initiator, catalyst and conditions shown in Table 1. In either Example, from the total amount of propylene oxide, only 50 g was supplied to the reactor at first (preliminary supplying of monomer), and after the catalyst was activated, the rest of propylene oxide and ε-caprolactone were supplied. Further, the rate of supplying monomers was the same as Example 1. From the results of $^1$H-NMR and $^{13}$C-NMR, it was confirmed that this diol had a random copolymer chain of ε-caprolactone and propylene oxide. The characteristics of the obtained polyol are shown in Table 1.

Example 3

Preparation Example for Random Copolymer of
ε-Caprolactone and Ethylene Oxide

To 1,000 g of polyoxypropylene diol which is the same as the initiator used in Example 1, 2,440 mg of the above slurry catalyst A (10.5 ppm as the amount of metal in the polymer upon completion of the polymerization) was added. After the interior of the reactor was flushed with nitrogen, the temperature was raised to 125° C. 500 g of ethylene oxide and 500 g of ε-caprolactone were respectively supplied with stirring, into the reactor at a rate of about 80 g/hr (the preliminary supplying of monomer was not carried out in this Example). It took 6 hours and 20 minutes to finish supplying ethylene oxide and ε-caprolactone, followed by stirring for further 1 hour to obtain a random copolymer of ε-caprolactone and ethylene oxide. From the results of $^1$H-NMR and $^{13}$C-NMR, it was confirmed that this diol had a random copolymer chain of ε-caprolactone and ethylene oxide. The characteristics of the obtained polyol are shown in Table 1.

Examples 4 to 9

Preparation Examples for Random Copolymers of
ε-Caprolactone and Ethylene Oxide

A polyol was obtained in the same manner as in Example 3, by using the initiator, catalyst and conditions shown in Table 1. From the results of $^1$H-NMR and $^{13}$C-NMR, it was confirmed that this diol had a random copolymer chain of ε-caprolactone and ethylene oxide. The characteristics of the obtained polyol are shown in Table 1.

In Example 6, polyoxytetramethylene glycol (Mw/Mn=1.95, Mn=1,410, manufactured by BASF, appearance: white colored solid, melting point: 36° C.) (in Table, "PTMG") was used as the initiator.

In Example 7, polyethylene glycol (Mw/Mn=1.10, Mn=1,000) (in Table, "PEG") was used as the initiator.

In Example 8, polyoxypropylene triol (Mw/Mn=1.04, Mn=1,340) was used as the initiator.

Examples 10 and 11

Preparation Examples for Random Copolymers of
δ-Valerolactone or β-Propiolactone and Ethylene Oxide A polyol was obtained in the same manner as in Example 3, except that δ-valerolactone (Example 10) or β-propiolactone (Example 11) was used instead of ε-caprolactone. From the results of $^1$H-NMR and $^{13}$C-NMR, it was confirmed that such a polyol had a random copolymer is chain of δ-valerolactone (Example 10) or β-propiolactone (Example 11) and ethylene oxide.

Examples 12 and 13

Preparation Examples for Random Copolymers of
ε-Caprolactone and 1,2-Butylene Oxide or Styrene Oxide A polyol was obtained in the same manner as in Example 1, except that 1,2-butylene oxide (Example 12) or styrene oxide (Example 13) was used instead of propylene oxide. From the results of $^1$H-NMR and $^{13}$C-NMR, it was confirmed that such a polyol had a random copolymer chain of ε-caprolactone and 1,2-butylene oxide (Example 12) or styrene oxide (Example 13). The characteristics of the obtained polyol are shown in Table 1.

Example 14

Preparation Example for Random Copolymer of
ε-Caprolactone, Ethylene Oxide and Propylene Oxide Following the method used in Example 1, 1,000 g of polyoxypropylene diol, which is the same as the initiator used in Example 1, was used as an initiator, and about 40 g/hr of ethylene oxide and propylene oxide and about 80 g/hr of ε-caprolactone were simultaneously supplied with stirring, into the reactor to carry out a polymerization reaction at 140° C. (the preliminary supplying of monomer was not carried out in this Example). Overall, 250 g of ethylene oxide, 250 g of propylene oxide and 500 g of s-caprolactone were polymerized to obtain a random copolymer of ε-caprolactone, ethylene oxide and propylene oxide. From the results of $^1$H-NMR and $^{13}$C-NMR, it was confirmed that such a polyol had a random copolymer chain of ε-caprolactone, ethylene oxide and propylene oxide. The characteristics of the obtained polyol are shown in Table 1.

Example 15

Preparation Example for Block-Random Copolymer
of ε-Caprolactone, Styrene Oxide and Propylene Oxide Into a reactor, 1,000 g of polyethylene glycol (Mw/Mn=1.10, Mn=1,000) as an initiator, and 2,440 mg of the slurry catalyst A (10.2 ppm as the amount of metal in the polymer upon completion of the polymerization) were added. After the interior of the reactor was flushed with nitrogen, the temperature was raised to 140° C., and with stirring, 50 g of propylene oxide was supplied to the reactor, followed by a reaction (preliminary supplying of monomer). After the pressure inside the reactor was decreased, further 250 g of propylene oxide was supplied to the reactor at a rate of 40 g/hr. After propylene oxide was added, stirring was continued for further one hour at 140° C. Then, a copolymerization reaction was carried out by supplying 250 g of styrene oxide at a rate of about 40 g/hr and 500 g of ε-caprolactone at a rate of about 80 g/hr simultaneously into the reactor. After completion of the addition of styrene oxide and ε-caprolactone, stirring was continued for further one hour at 140° C. From the results of $^1$H-NMR and $^{13}$C-NMR, it was confirmed that this diol had a block is polymer chain of propylene oxide, and had a random copolymer chain of ε-caprolactone and styrene oxide. The characteristics of the obtained polyol are shown in Table 1.

Example 16

Preparation Example for Random Copolymer of ε-Caprolactone and Ethylene Oxide

A monool was obtained in the same manner as in Example 3, except that the initiator was changed to 500 g of ethylene glycol mono-n-butyl ether (Mw/Mn=1.99, Mn=74). From the results of $^1$H-NMR and $^{13}$C-NMR, it was confirmed that this monool had a random copolymer chain of ε-caprolactone and ethylene oxide. The characteristics of the obtained monool are shown in Table 1.

Example 17

Preparation Example for Random Copolymer of ε-Caprolactone and Ethylene Oxide

A polyol was obtained in the same manner as in Example 3, except that the initiator was changed to 1,000 g of a propylene oxide adduct of a sorbitol (Mw/Mn=1.30, Mn=18,500). From the results of $^1$H-NMR and $^{13}$C-NMR, it was confirmed that this polyol had a random copolymer chain of ethylene oxide and ε-caprolactone. The characteristics of the obtained polyol are shown in Table 1.

Example 18

Preparation Example for Random Copolymer of ε-Caprolactone and Propylene Oxide

A polyol was obtained in the same manner as in Example 1, except that 1,000 g of tetrahydrofuran was used further as a solvent. From the results of $^1$H-NMR and $^{13}$C-NMR, it was confirmed that this polyol had a random copolymer chain of ε-caprolactone and propylene oxide. The characteristics of the obtained polyol are shown in Table 1.

Comparative Example 1

Preparation Example for Random Copolymer of ε-Caprolactone and Propylene Oxide by Using Alkali Catalyst Hydroxyl groups of polyoxypropylene diol were alcoholated by adding 1,000 g of polyoxypropylene diol which is the same as the initiator used in Example 1 and 12 g of a 50 mass % potassium hydroxide aqueous solution, followed by dehydration under reduced pressure at 120° C. for 12 hours. Then, after the interior of the reactor was flushed with nitrogen, the temperature was raised to 140° C., and 500 g of the propylene oxide and 500 g of ε-caprolactone were respectively supplied into the reactor at a rate of about 80 g/hr. Propylene oxide and ε-caprolactone were supplied for 6 hours and 20 minutes, and stirring was continued at 140° C. for further 1 hour, and then, dehydration was carried out under reduced pressure at 100° C. for 30 minutes to obtain a polyester ether diol containing the alkali catalyst. The polyester ether diol obtained in this Example had Mw/Mn of 1.14 and Mn of 3,320. Further, the appearance of this diol was yellowish liquid, and the viscosity was 4,200 mPa·s at 25° C.

Purification

Based on potassium hydroxide contained in the above polyester ether diol, 1 equivalent amount of an acidic sodium pyrophosphate was added as a neutralizer together with 4 g of deionized water, followed by stirring at 70° C. for 1 hour. Then, 3 mass % of synthetic magnesium silica (tradename: KYOWAAD KW600 manufactured by Kyowa Chemical Industry Co., Ltd) as an adsorbent and 500 ppm of 2,6-di-t-butyl-4-methylphenol (BHT) as an antioxidizing agent were added, followed by stirring at 70° C. for 1 hour. Then, after dehydration at 120° C. for 4 hours, an operation for purification was carried out by separation by filtration. The polyester ether diol obtained by the operation for purification had Mw/Mn of 1.45 and Mn of 3,080. Further, the appearance of this diol was yellowish liquid, and the viscosity was 2,200 mPa·s at 25° C. Further, it was confirmed that 10,900 ppm of potassium hydroxide remained.

Repurification

In spite of the above operation for purification, it was found that potassium hydroxide remained inside the above diol. Therefore, an operation for purification was again, carried out in the same manner as above. The polyester ether diol obtained by this repurification had Mw/Mn of 1.48 and Mn of 2,980. Further, the appearance was yellowish liquid, and the viscosity was 2,200 mPa·s at 25° C. It was confirmed that 9,810 ppm of potassium hydroxide remained inside the obtained diol. This indicates that in a case where the alkali catalyst is used to copolymerize a cyclic ester compound and an alkylene oxide to produce a polyester ether polyol, the amount of an alkali catalyst remaining in the polyol is too large to carry out the purification enough, and the molecular weight distribution was so wide that only the polyol having a high viscosity was obtained.

Comparative Example 2

Preparation Example for Random Copolymer of ε-Caprolactone and Ethylene Oxide by Using Slurry Catalyst B A polymerization reaction was carried out in the same manner as in Example 3, except that the slurry catalyst A of Example 3 was changed to a slurry catalyst B (2,440 mg, and 19.6 ppm as the amount of metal in the polymer upon completion of the polymerization), and a random copolymer of ε-caprolactone and ethylene oxide was obtained. However, in this Example, by the time 110 g of ethylene oxide and 110 g of ε-caprolactone were supplied into the reactor, the pressure inside the reactor reached 0.8 MPa, whereby it was found that ring-opening addition polymerization of ethylene oxide may not be carried out smoothly, so that supplying of monomers was stopped, and the monomers remained inside the reactor was distilled under reduced pressure, whereby 45 g of ethylene oxide and 105 g of ε-caprolactone i.e. a total of 150 g was recovered. The polyester ether diol obtained by this reaction had Mw/Mn of 1.22 and Mn of 1,450. The appearance was brownish liquid, and the viscosity was 740 mPa·s at 25° C.

The polymerization reaction stopped in halfway, so that the desired molecular weight could not be reached.

Comparative Example 3

Preparation Example for Random Copolymer of
ε-Caprolactone and Ethylene Oxide by Using Slurry
Catalyst B The amount of the slurry catalyst B used was raised to 9,760 mg (49.7 ppm as the amount of metal in the polymer upon completion of the polymerization), and the polymerization reaction was carried out in the same manner as in the above Comparative Example 2. In addition, 500 g of ethylene oxide and 500 g of ε-caprolactone were respectively supplied into the reactor at a rate of about 80 g/hr to obtain a random copolymer of ε-caprolactone and ethylene oxide. 310 g of ε-caprolactone was recovered during degassing after ε-caprolactone and ethylene oxide were supplied. The polyester ether diol obtained by this reaction had Mw/Mn of 1.51 and Mn of 2,370. The appearance of this diol was brownish liquid at room temperature, and the viscosity was 2,700 mPa·s. The ring-opening addition reaction of ethylene oxide proceeded, but the ring-opening addition reaction of ε-caprolactone did not proceed. Therefore, the desired molecular weight could not be reached, and a diol containing the desired amount of ε-caprolactone units was not obtained.

Comparative Example 4

Preparation Example for Random Copolymer of
ε-Caprolactone and Ethylene Oxide by Using Slurry
Catalyst B A random copolymer of ε-caprolactone and ethylene oxide was obtained by the polymerization reaction carried out in the same manner as in Comparative Example 3, except that 1,000 g of polyoxypropylene diol which is the same as the initiator used in Example 1, was used, and 9,760 mg of the slurry catalyst B (47.7 ppm as the amount of metal in the polymer upon completion of the polymerization) and 1,000 g of tetrahydrofuran as a solvent were added thereto to make an initiator mixture; and into the mixture, 500 g of ε-caprolactone and 500 g of ethylene oxide were added. After the reaction, tetrahydrofuran was distilled under reduced pressure, and 240 g of ε-caprolactone was recovered simultaneously. The polyester ether diol obtained by this reaction had Mw/Mn of 1.48 and Mn of 2,590. The appearance of the diol was brownish liquid at room temperature, and the viscosity was 2,619 mPa·s at 25° C. The ring-opening addition reaction of ethylene oxide proceeded by using the tetrahydrofuran solvent, but a ring-opening addition reaction of ε-caprolactone did not proceed after halfway. Therefore, the obtained diol could not reach the desired molecular weight, and a diol containing the desired amount of ε-caprolactone units was not obtained.

Comparative Example 5

Preparation Example for Random Copolymer of
ε-Caprolactone and Propylene Oxide by Using
Slurry Catalyst A A polymerization reaction was carried out in the same manner as in Example 1, except that the inside temperature of the reactor was changed to 190° C. In such a case, the ring-opening addition polymerization was not carried out smoothly, so that after 290 g of propylene oxide and 290 g of ε-caprolactone were supplied into the reactor, the pressure inside the reactor reached 0.8 MPa. Therefore, supplying of monomers was stopped, and the monomers remained inside the reactor were distilled under reduced pressure, whereby 40 g of propylene oxide and 90 g of ε-caprolactone i.e. a total of 130 g was recovered. The polyester ether diol obtained by this reaction had Mw/Mn of 1.55 and Mn of 2,480. The appearance of this diol was brownish liquid, and the viscosity was 880 mPa·s at 25° C.

The polymerization reaction stopped in halfway, so that the desired molecular weight could not be reached.

Comparative Example 6

Preparation Example for Random Copolymer of
ε-Caprolactone and Propylene Oxide by Using
Slurry Catalyst A A polymerization reaction was carried out in the same manner as in Example 1, except that the inside temperature of the reactor was changed to 110° C. 180 g of ε-caprolactone was recovered during degassing after ε-caprolactone and propylene oxide were supplied, and predetermined reaction time was passed. The polyester ether diol obtained by this reaction had Mw/Mn of 1.34 and Mn of 2,740. The appearance of this diol was light brownish liquid at room temperature, and the viscosity was 598 mPa·s at 25° C. In such a case, the ring-opening addition reaction of ethylene oxide proceeded, but the ring-opening addition reaction of ε-caprolactone did not proceed. Therefore, the desired molecular weight could not be reached, and a product containing the desired amount of ε-caprolactone units was not obtained.

Comparative Example 7

Preparation Example for Random Copolymer of
ε-Caprolactone and Propylene Oxide by Using
Slurry Catalyst B A random copolymer of ε-caprolactone and propylene oxide was obtained by the polymerization reaction carried out in the same manner as in Comparative Example 6, except that the slurry catalyst A was changed to 43,400 mg of the slurry catalyst B (182.2 ppm as the amount of metal in the polymer upon completion of the polymerization), and 1,000 g of tetrahydrofuran was added as a solvent; and the inside temperature of the reactor was changed to 90° C. The polyester ether diol obtained by this reaction had Mw/Mn of 1.68 and Mn of 2,850. The appearance of this diol was brownish liquid at room temperature, and the viscosity was 1,289 mPa·s at 25° C. The copolymerization reaction of ε-caprolactone and ethylene oxide proceeded also by using tetrahydrofuran solvent, but the obtained diol had a wide molecular weight distribution.

The obtained results are summarized and shown in Tables 1 and 2.

As Tables 1 and 2 show, by using the slurry catalyst A containing the DMC catalyst of the present invention, and by setting the polymerization temperature to be from 115° C. to 180° C., it is possible to smoothly carry out copolymerization of a cyclic ester compound and an alkylene oxide with an initiator having hydroxyl groups, and produce a polyester poly- or mono-ol having a narrow molecular weight distribution.

Further, in the process for producing a polyester ether poly- or mono-ol of the present invention, it is possible to choose preferred ones with respect to the number average molecular weight (Mn), the molecular weight distribution (Mw/Mn) of an initiator to be used, and the number of hydroxyl groups per molecule; the type and amount of the DMC catalyst for the polymerization reaction; the types, amounts and proportions of the cyclic ester compound and the alkylene oxide to be copolymerized with the initiator by ring-opening addition, within the scope of the present invention. Further, it is possible to properly adjust the reaction temperature of the copolymerization, the intensity of stirring and the supplying rate of the cyclic ester compound and the alkylene oxide to the reactor. By adjusting these, it is possible to produce a polyester ether poly- or mono-ol having the desired characteristics in addition to ones shown in the above Examples.

Abbreviations employed in the following Tables 1 and 2 are as below.

Initiator Structure:
  A: polyoxypropylene diol
  B: polyoxypropylene triol
  C: propylene oxide adduct of sorbitol
  PEG: polyethylene glycol
  PTMG: polyoxytetramethylene glycol
  BC: ethylene glycol mono-n-butyl ether Alkylene Oxide:
  PO: propylene oxide
  EO: ethylene oxide
  BO: 1,2-butylene oxide
  SO: styrene oxide

TABLE 1

| | | Example No. | | | | | |
|---|---|---|---|---|---|---|---|
| Items | | 1 | 2 | 3 | 4 | 5 | 6 |
| Initiator | Structure | A | A | A | A | A | PTMG |
| | Amount [g] | 1000 | 1000 | 1000 | 1000 | 1000 | 1000 |
| | Mw/Mn | 1.1 | 1.1 | 1.1 | 1.1 | 1.1 | 1.95 |
| | Mn | 1390 | 1390 | 1390 | 1390 | 1390 | 1410 |
| Catalyst | Slurry catalyst A*[1] [mg], (ppm) | 2440 (10.2) | 2440 (10.5) | 2440 (10.5) | 2440 (10.5) | 610 (2.6) | 2440 (7) |
| Solvent (THF) [g] | | None | None | None | None | None | None |
| Inside temperature of reactor [° C.] | | 140 | 140 | 125 | 180 | 140 | 140 |
| Alkylene oxide | PO [g] | 550 | 350 | | | | |
| | EO [g] | | | 500 | 500 | 500 | 1000 |
| | BO [g] | | | | | | |
| | SO [g] | | | | | | |
| Cyclic ester | ε-Caprolactone [g] | 500 | 650 | 500 | 500 | 500 | 1000 |
| | δ-Valerolactone [g] | | | | | | |
| | β-Propiolactone [g] | | | | | | |
| Product | Mw/Mn | 1.11 | 1.12 | 1.33 | 1.37 | 1.38 | 1.13 |
| | Mn | 2950 | 2760 | 2470 | 2510 | 2460 | 4910 |
| | Viscosity [mPa·s, 25° C.] | 810 | 900 | 1060 | 1240 | 1200 | 850*[4] |

*[1]The upper number is the amount of catalyst (mg), and the lower number is the amount of metal derived from the catalyst contained in the polymer upon completion of the polymerization (ppm)
*[4]Result at 40° C.

| | | Example No. | | | | | |
|---|---|---|---|---|---|---|---|
| Items | | 7 | 8 | 9 | 10 | 11 | 12 |
| Initiator | Structure | PEG | B | A | A | A | A |
| | Amount [g] | 500 | 1000 | 1000 | 1000 | 1000 | 1000 |
| | Mw/Mn | 1.1 | 1.04 | 1.1 | 1.1 | 1.1 | 1.1 |
| | Mn | 1000 | 1340 | 1390 | 1390 | 1390 | 1390 |
| Catalyst | Slurry catalyst A*[1] [mg], (ppm) | 2440 (3.8) | 2440 (4.2) | 2440 (10.5) | 2440 (10.5) | 2440 (10.5) | 2440 (10.2) |
| Solvent (THF) [g] | | None | None | None | None | None | None |
| Inside temperature of reactor [° C.] | | 140 | 140 | 140 | 140 | 140 | 140 |
| Alkylene oxide | PO [g] | | | | | | |
| | EO [g] | 2500 | 2000 | 200 | 500 | 500 | |
| | BO [g] | | | | | | 550 |
| | SO [g] | | | | | | |
| Cyclic ester | ε-Caprolactone [g] | 2500 | 2000 | 800 | | | 500 |
| | δ-Valerolactone [g] | | | | 500 | | |
| | β-Propiolactone [g] | | | | | 500 | |
| Product | Mw/Mn | 1.29 | 1.17 | 1.15 | 1.33 | 1.31 | 1.18 |
| | Mn | 14900 | 7710 | 3080 | 2590 | 2490 | 3060 |
| | Viscosity [mPa·s, 25° C.] | At least 100,000 | At least 100,000 | 1060 | 1190 | 1390 | 970 |

*[1]The upper number is the amount of catalyst (mg), and the lower number is the amount of metal derived from the catalyst contained in the polymer upon completion of the polymerization (ppm)

| | | Example No. | | | | | |
|---|---|---|---|---|---|---|---|
| Items | | 13 | 14 | 15 | 16 | 17 | 18 | 19 |
| Initiator | Structure | A | A | PEG | BC | C | A | A |
| | Amount [g] | 1000 | 1000 | 1000 | 500 | 1000 | 1000 | 1000 |

TABLE 1-continued

|  |  |  |  |  |  |  |  |  |
|---|---|---|---|---|---|---|---|---|
|  | Mw/Mn | 1.1 | 1.1 | 1.1 | 1 | 1.3 | 1.1 | 1.1 |
|  | Mn | 1390 | 1390 | 1000 | 74 | 18500 | 1390 | 1390 |
| Catalyst | Slurry catalyst A*[1] [mg], (ppm) | 2440 (10.2) | 2440 (10.5) | 2440 (10.2) | 2440 (3.8) | 2440 (4.2) | 2440 (10.2) | 2440 (10.2) |
| Solvent (THF) [g] |  | None | None | None | None | None | 1000 | None |
| Inside temperature of reactor [° C.] |  | 140 | 140 | 140 | 140 | 140 | 140 | 140 |
| Alkylene oxide | PO [g] |  | 250 | 300 |  |  | 550 | 850 |
|  | EO [g] |  | 250 |  | 2500 | 2000 |  |  |
|  | BO [g] |  |  |  |  |  |  |  |
|  | SO [g] | 550 |  | 250 |  |  |  |  |
| Cyclic ester | ε-Caprolactone [g] | 500 | 500 | 500 | 2500 | 2000 | 500 | 200 |
|  | δ-Valerolactone [g] |  |  |  |  |  |  |  |
|  | β-Propiolactone [g] |  |  |  |  |  |  |  |
| Product | Mw/Mn | 1.25 | 1.15 | 1.38 | 1.14 | 1.38 | 1.13 | 1.06 |
|  | Mn | 2890 | 3080 | 2810 | 1430 | 129000 | 3000 | 3100 |
|  | Viscosity [mPa·s, 25° C.] | 1400 | 1060 | 3406 | 164 | At least 100,000 | 820 | 680 |

*[1] The upper numbers are amounts of catalyst (mg), and the lower numbers are amounts of metal derived from the catalyst contained in the polymer upon completion of the polymerization (ppm)

TABLE 2

|  |  | Example No. | | | | | | |
|---|---|---|---|---|---|---|---|---|
| Items |  | 1 | 2 | 3 | 4 | 5 | 6 | 7 |
| Initiator | Structure | A | A | A | A | A | A | A |
|  | Amount [g] | 1000 | 1000 | 1000 | 1000 | 1000 | 1000 | 1000 |
|  | Mw/Mn | 1.1 | 1.1 | 1.1 | 1.1 | 1.1 | 1.1 | 1.1 |
|  | Mn | 1390 | 1390 | 1390 | 1390 | 1390 | 1390 | 1390 |
| Catalyst | Alkali catalyst [g] | 6 |  |  |  |  |  |  |
|  | Slurry catalyst B*[1] [mg], (ppm) |  | 2440 (19.6) | 9760 (49.7) | 9760 (47.7) |  |  | 43400 (182.2) |
|  | Slurry catalyst A*[1] [mg], (ppm) |  |  |  |  | 2440 (14.5) | 2440 (11.2) |  |
| Solvent (THF) [g] |  | None | None | None | 1000 | None | None | 1000 |
| Inside temperature of reactor [° C.] |  | 140 | 125 | 125 | 125 | 190 | 110 | 90 |
| Alkylene oxide | PO [g] | 500 |  |  |  | 290 | 550 | 550 |
|  | EO [g] | 110 | 500 | 500 |  |  |  |  |
| Cyclic ester ε-caprolactone [g] |  | 500 | 110 | 500 | 500 | 290 | 500 | 500 |
| Product | Mw/Mn | 1.41 | 1.22 | 1.51 | 1.48 | 1.55 | 1.34 | 1.68 |
|  | Mn | 3320 | 1450 | 2370 | 2590 | 2480 | 2740 | 2850 |
|  | Viscosity [mPa·s, 25° C.] | 4200 | 740 | 2700 | 2619 | 880 | 598 | 1289 |
| Recovered monomers*[2] [g] |  | None | 150 EO: 45 g, CL: 105 g | 310 CL: 310 g | 240 CL: 240 g | 130 PO: 40 g, CL: 90 g | 180 CL: 180 g | None |
| Results |  | Alkali catalyst could not be removed from the final product | Polymerization reaction stopped in halfway | Unreacted caprolactone was removed | Unreacted caprolactone was removed | Polymerization reaction stopped in halfway | Unreacted caprolactone was removed | Molecular weight distribution became wide |

*[1] The upper numbers are amounts of catalyst (mg), and the lower numbers are amounts of metal derived from the catalyst contained in the polymer upon completion of the polymerization (ppm)
*[2] The monomer recovered inside a cold trap interposed between a pump and a reactor, when the monomer was supplied and stirred for further 1 hour, followed by degassing CL: caprolactone

INDUSTRIAL APPLICABILITY

The polyester ether poly- or mono-ol of the present invention may be reacted with a polyisocyanate compound and optionally, a chain extender, to obtain various urethane products. Further, the polyester ether poly- or mono-ol obtained by the present invention may be used as a functional lubricant, such as a base oil for grease, compressor oil, rolling oil, gear oil, metal-working fluid, traction drive oil, engine oil or excavation oil; a surfactant; or a material for a polymer dispersed polyester ether polyol containing fine polymer particles.

The entire disclosure of Japanese Patent Application No. 2005-236504 filed on Aug. 17, 2005 including specification, claims, drawings and summary is incorporated herein by reference in its entirety.

What is claimed is:

1. A process for producing a polyester ether polyol and/or a polyester ether monool having a molecular weight distribution (Mw/Mn) of from 1.02 to 1.4, comprising copolymerizing at least one cyclic ester compound which carbon number is from 3 to 9, and at least one alkylene oxide which carbon number is from 2 to 20 with at least one initiator having from 1 to 12 hydroxyl groups and having a number average molecular weight (Mn) of from 18 to 20,000 at a reaction temperature of from 115 to 180° C. in the presence of a double-metal cyanide complex catalyst having tert-butyl alcohol as at least a part of an organic ligand.

2. The process according to claim 1, wherein the mass of the cyclic ester compound is in a range of from 5 to 90% based on the total mass of the cyclic ester compound and the alkylene oxide used for the copolymerization.

3. The process according claim 1, wherein the copolymerization of the cyclic ester compound and the alkylene oxide is random copolymerization or random/block copolymerization.

4. The process according to claim 1, wherein the copolymerization is carried out in the absence of a solvent.

5. The process according to claim 1, wherein the double-metal cyanide complex catalyst is used in such an amount that the total amount of metals derived from the double-metal cyanide complex catalyst in the polyester ether polyol and/or the polyester ether monool obtained by the copolymerization, is from 1 to 30 ppm.

6. The process according to claim 1, wherein the double-metal cyanide complex catalyst contains as the organic ligand, tert-butyl alcohol alone or a combination of tert-butyl alcohol and at least one member selected from the group consisting of n-butyl alcohol, sec-butyl alcohol, iso-butyl alcohol, tert-pentyl alcohol, iso-pentyl alcohol, N,N-dimethylacetamide and ethylene glycol mono-tert-butyl ether.

7. The process according to claim 1, wherein the initiator contains a polyether polyol and/or a polyester monool having a molecular weight distribution (Mw/Mn) of at most 3.0.

* * * * *